B. C. & R. N. RIBLET.
TRACTOR.
APPLICATION FILED NOV. 6, 1915.
1,240,488.
Patented Sept. 18, 1917.
3 SHEETS—SHEET 1.
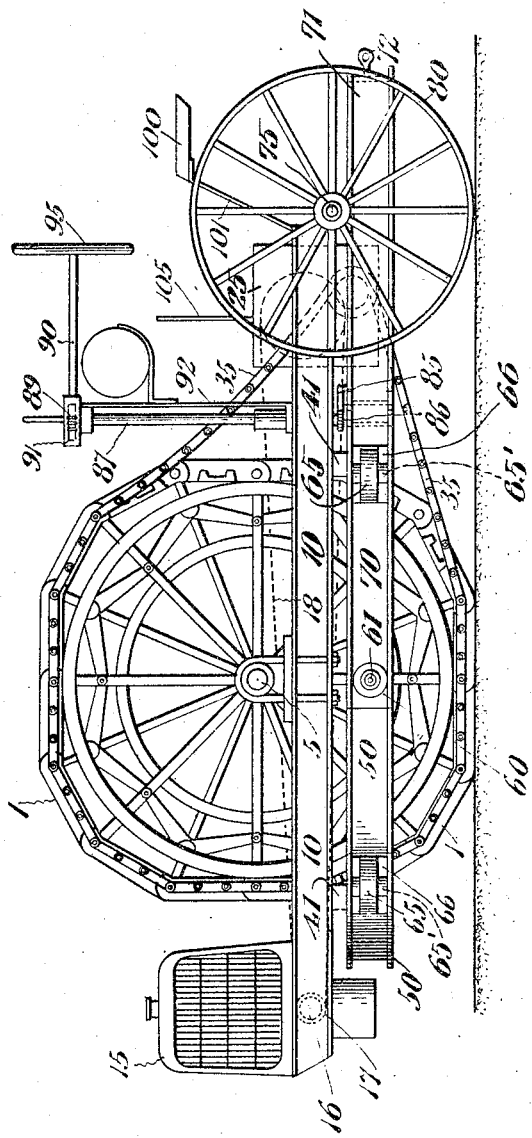

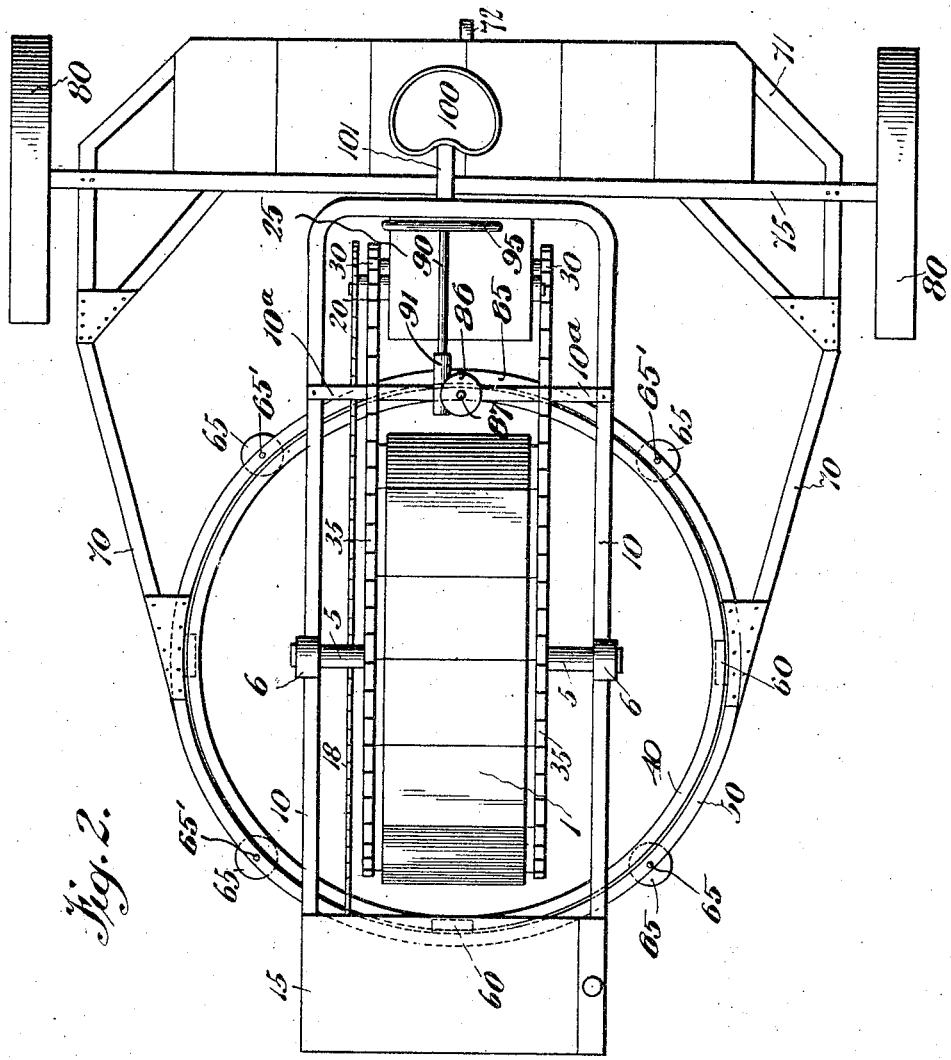

B. C. & R. N. RIBLET.
TRACTOR.
APPLICATION FILED NOV. 6, 1915.
1,240,488.
Patented Sept. 18, 1917.
3 SHEETS—SHEET 3.
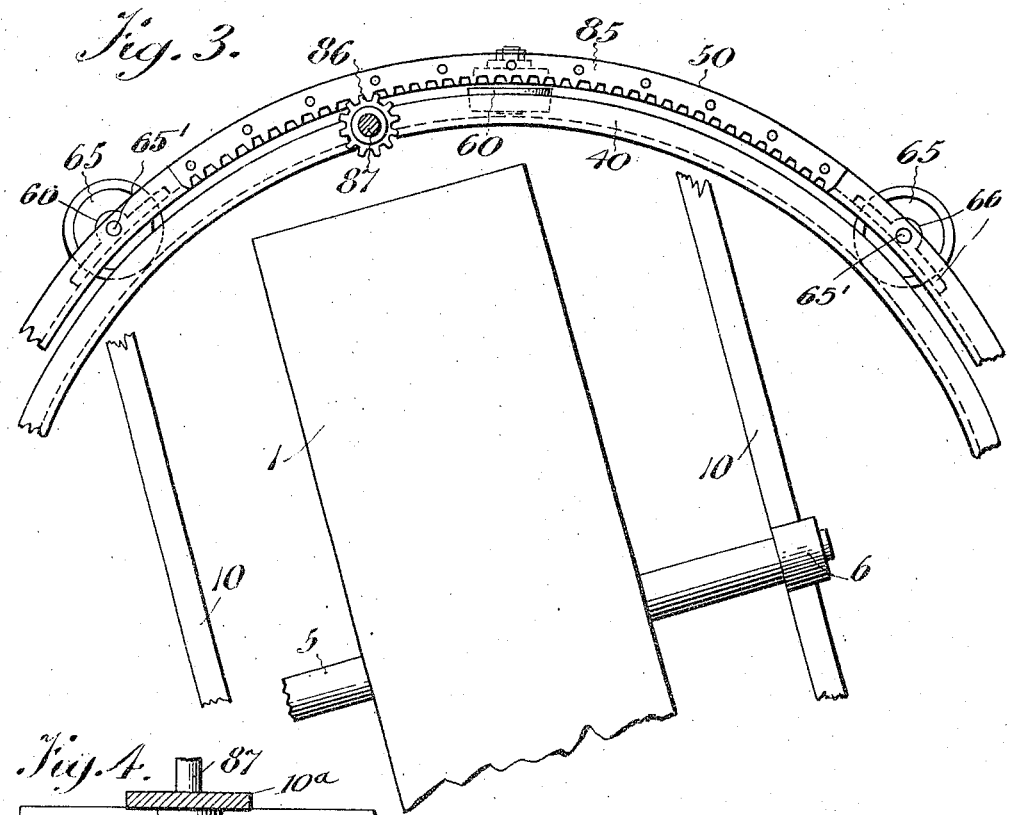
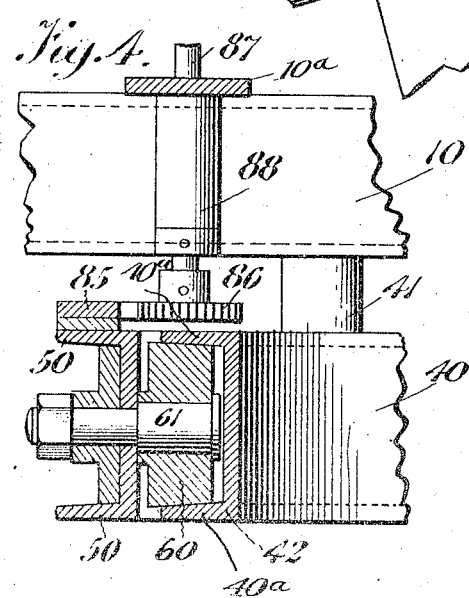
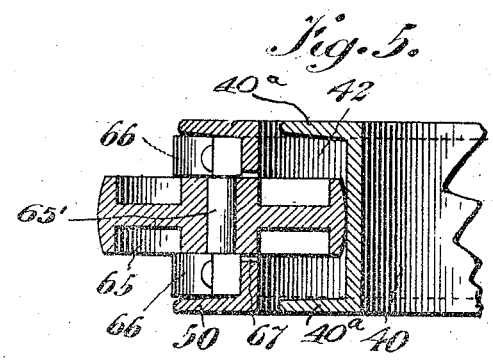
Byron C. Riblet and
Royal N. Riblet Inventors
By their Attorneys

UNITED STATES PATENT OFFICE.

BYRON C. RIBLET AND ROYAL N. RIBLET, OF SPOKANE, WASHINGTON.

TRACTOR.

1,240,488.  Specification of Letters Patent.  Patented Sept. 18, 1917.

Application filed November 6, 1915. Serial No. 60,142.

*To all whom it may concern:*

Be it known that we, BYRON C. RIBLET and ROYAL N. RIBLET, citizens of the United States, residing at Spokane, in the county of Spokane and State of Washington, have invented certain new and useful Improvements in Tractors, of which the following is a full and clear specification.

The object of the present invention is to produce an improved form of tractor, for pulling ordinary agricultural machines, such as are now commonly used upon farms, and hauled by three or four horses. Much trouble has been experienced with farm tractors, as heretofore used, because of the difficulty in steering them over the soft ground on which they frequently have to operate and also because of their tendency to skid or slide on side hills.
These difficulties are overcome in the present invention in which the motive power, usually in the form of an internal combustion engine, the gearing and seat for the driver are all mounted upon a rigid frame which is hung upon the horizontal axis of the traction wheel or wheels in approximately balanced condition, said rigid frame being suitably journaled within an inclosing trailer frame, mounted upon trailer wheels and carrying suitable anti-friction rollers, which resist the vertical and horizontal strains between the tractor frame and the trailer frame. Suitable steering mechanism, under the control of the driver, is carried by the tractor frame for rotating the tractor frame horizontally in the trailer frame, to properly direct the course of the tractor. The rigid tractor frame includes a channel iron guide ring suspended from it and resting concentrically within a channel iron guide ring carried by the trailer frame, the traction wheel or wheels being mounted entirely within the tractor frame and its guide ring.
In order that our invention may be fully understood we will first describe the same with reference to the accompanying drawings and afterward point out the novelty more particularly in the annexed claims.
Figure 1 is a side elevation of our improved farm tractor;

Fig. 2 is a plan view of the same;

Fig. 3 is an enlarged detail sectional plan view, illustrating parts of the steering mechanism, and the guide rollers between the inner and outer guide rings;

Figs. 4 and 5 are enlarged detail vertical sectional views of parts of the same.

1 is a traction wheel of any approved construction. The traction wheel illustrated in the drawings is of the form known in the trade as the Riblet square wheel, (covered by Patent No. 1,134,960, dated April 6th, 1915) but the particular form of traction wheel is not essential in the present invention as, in fact, we may use either the single broad faced traction wheel, such as shown, or we may employ instead two traction wheels mounted upon a common axis.

Traction wheel or wheels 1 are suitably mounted upon a horizontal axle 5, projecting laterally at both sides and supporting upon their ends journal boxes 6, from which is hung the oblong tractor frame 10. The frame 10 is formed of heavy channel iron properly shaped and braced to make it rigid and is hung upon the axle 5, with its length extending at right angles to the axle. The line of suspension of the oblong frame upon the axle approximately centrally of its length is determined by the approximate weight of the parts of the mechanism to be mounted upon the opposite ends of the frame, it being desired to nearly balance the frame and mechanisms carried by it upon the axis of the tractor wheel or wheels.

Mounted upon one end of the rigid tractor frame 10 is a motor 15 of any desired construction, shown more or less diagrammatically in the drawings as an internal combustion engine. The crank shaft 16, carrying a driving sprocket 17 (indicated in dotted lines in Fig. 1) drives the transmission chain 18, which extends to the opposite end of the oblong frame 10 and gears with a sprocket wheel 20, which operates suitable transmission gearing mounted in the case 25. The particular form of a transmission gearing is not illustrated in the drawing as it may be of any approved construction. The transmission, as shown, includes a pair of driving sprockets, 30, mounted upon a shaft projecting at opposite sides from the casing 25 and operating upon sprocket chains 35, which encircle the sectional sprocket drive wheels of the traction wheel 1. Suspended from and rigidly secured to the tractor frame 10 is a channel iron guide ring 40 properly spaced from the frame 10 by blocks 41. This guide ring 40 has its guide channel 42 occurring between flanges 40ª presented outwardly to receive vertical and horizontal guide rollers carried by the trailer frame, which will now be described.

50 is the channel iron guide ring of the trailer frame, which surrounds the tractor guide ring 40 and carries the guide rollers which maintain the parts in operative relation and resist the horizontal and vertical strains between them. This outer guide ring 50 carries four vertical guide rollers 60 of conoidal shape, which are mounted upon bearing studs 61, secured in the ring 50, as shown in Fig. 4 of the drawings and presented in the channel 42 of inner guide ring 40. The four vertical rollers 60 resist any vertical strain between the inner and outer guide rings 40 and 50.

The outer guide ring 50 also carries a series of four horizontal guide rollers 65, mounted upon vertical axes 65' located by brackets 66 secured to the outer guide ring, the rollers being presented through horizontal slots 67 to engage the vertical face of the channel 42 of inner ring 40, as shown in Fig. 5 of the drawing. These guide rollers 65 resist all strains in a horizontal direction between the tractor frame and the trailer frame.

The guide ring 50 forming the forward part of the trailer frame is rigidly secured to the channel iron side frames 70, which spread outwardly therefrom and are braced at the rear into a suitable draft frame 71, carrying a draft eye or hook 72 and mounted upon the axle 75 supported by draft wheels 80.

The outer guide ring 50 is provided at its rear with a segment rack 85, the teeth of which are presented forwardly and intermesh with pinion 86, keyed to the lower end of a vertical steering shaft 87, suitably journaled in bearing 88 carried by a cross brace 10ᵃ of the tractor frame 10. This steering shaft 87 is provided at its upper end with a worm gear (not shown), meshing with a worm 89, formed on the forward end of a horizontal steering shaft 90, properly journaled in the gear casing 91, braced by the vertical stay rod 92. The horizontal steering shaft 90 carries the steering wheel 95, which is presented directly in front of the driver's seat 100, mounted upon arm 101, secured to the rear end of the tractor frame 10. 105 represents a lever for controlling the clutch of the gear.

It will be observed that the trailer frame carrying the outer guide ring 50 is supported at its forward end upon the inner guide ring 40 of the tractor frame and tends to stabilize the tractor frame. The antifriction rollers between the guide ring of the tractor frame and the guide ring of the trailer frame resist all horizontal and vertical strains between the two frames and afford effective anti-friction bearings upon which the tractor frame can readily turn in a horizontal plane. The weight of the engine gearing and driver is approximately balanced upon the tractor frame, which turns with the tractor wheel under the control of the steering mechanism. The draft eye or hook is preferably directly behind the traction wheel, so that pull upon the machine being operated will always be in the direction in which the tractor is moved. The traction wheel is a combined propelling and steering wheel. It will be observed that the rigid tractor frame is an oblong shape with its length extending at right angles to the axle of the traction wheel. The motor, the driving gear and seat for the driver are proportionately arranged upon opposite ends of this rigid oblong frame, so as to approximately balance the weight of the frame and mechanism supported by it upon the axle of the traction wheel. This weight is also arranged as near as possible equally upon opposite sides of the central longitudinal plane of the traction wheel. This arrangement is of value in increasing the stability of the machine. The wheel guide frame, surrounding the guide ring of the tractor frame and spreading laterally therefrom, as it projects rearwardly to the axle, presents an effective resistance against any tendency to tip over and is also important as resisting any tendency that the machine might otherwise have to skid or slide upon side hills. The main weight of the machine being properly balanced upon the traction wheel affords excellent traction and, as in steering, the tractor frame and traction wheel turn together, this relation of the weight of the traction wheel is always maintained.

We claim:

1. A tractor comprising traction means, a rigid frame supported by and surrounding said traction means and carrying a guide ring, power mechanism mounted upon said rigid frame on one side of said traction means and having driving connection with said traction means, a wheeled stabilizing guide frame carrying a guide ring concentric with the guide ring on the rigid frame and journaled thereto, and steering mechanism mounted on said rigid frame on the side opposite said power mechanism and geared to said guide frame for turning said rigid frame horizontally relative to said guide frame.

2. A tractor comprising traction means, a rigid frame supported by and surrounding said traction means and carrying a guide ring, power mechanism mounted upon said rigid frame on one side of said traction means and having driving connection with said traction means, a wheeled stabilizing guide frame carrying a guide ring concentric with the guide ring on the rigid frame, guide rollers mounted in one of said guide rings and engaging the other of said guide rings, and steering mechanism mounted on said rigid frame on the side opposite said power mechanism and geared to said guide frame for turning said rigid frame horizontally relative to said guide frame.

3. A tractor comprising traction means, a rigid frame supported by and surrounding said traction means, power mechanism mounted upon said rigid frame on one side of said traction means and having driving connection with said traction means, a wheeled stabilizing guide frame surrounding said traction means, concentric channel-iron guide rings carried respectively by said rigid frame and said guide frame, vertical and horizontal rollers journaled in one of said channel-iron guide rings and engaging the other of said rings, and steering mechanism mounted upon said rigid frame on the side opposite said power mechanism and geared to said guide frame for turning said rigid frame horizontally relative to said guide frame.

4. A tractor comprising traction means, a rigid frame supported by and surrounding said traction means, power mechanism mounted upon said rigid frame on one side of said traction means and having driving connection with said traction means, a wheeled stabilizing guide frame surrounding said traction means, having widely spaced wheels and an intermediate platform, concentric guide rings carried respectively by said rigid frame and said guide frame and surrounding said traction means, guide rollers mounted in one of said rings and engaging the other of said rings, steering mechanism mounted on said rigid frame on the side opposite said power mechanism and geared to said guide frame for turning said rigid frame horizontally relative to said guide frame and a seat supported on said rigid frame and adapted to overhang the platform.

BYRON C. RIBLET.
ROYAL N. RIBLET.